United States Patent
Wendel

(10) Patent No.: US 8,082,701 B1
(45) Date of Patent: Dec. 27, 2011

(54) COMBINED GUIDE-NAIL SHIELD AND PROCESS

(76) Inventor: Ronald M. Wendel, Riverview, MI (US)

( * ) Notice: Subject to any disclaimer, the term of this patent is extended or adjusted under 35 U.S.C. 154(b) by 1797 days.

(21) Appl. No.: 10/880,338

(22) Filed: Jun. 28, 2004

Related U.S. Application Data

(60) Provisional application No. 60/491,468, filed on Jul. 30, 2003.

(51) Int. Cl.
*E04B 1/00* (2006.01)
*E04B 1/38* (2006.01)

(52) U.S. Cl. .......................... 52/127.5; 52/100

(58) Field of Classification Search ............... 52/127.7, 52/127.5, DIG. 1, 98–100, 147, 220.1, 220.8, 52/716.1, 357, 359, 514, 717.06, 716.8; 408/72 R, 408/115 R; 248/65

See application file for complete search history.

(56) References Cited

U.S. PATENT DOCUMENTS

| | | | | |
|---|---|---|---|---|
| 3,240,869 A * | 3/1966 | Jureit | ............................ | 174/135 |
| 4,050,205 A * | 9/1977 | Ligda | .............................. | 52/357 |
| 4,738,071 A * | 4/1988 | Ezard | ......................... | 52/745.19 |
| 5,114,285 A * | 5/1992 | Brydon | ..................... | 408/115 R |
| 5,222,845 A * | 6/1993 | Goldstein et al. | ............. | 408/103 |
| 5,573,352 A * | 11/1996 | Matadobra | .................... | 409/132 |
| 6,176,057 B1 * | 1/2001 | Bouchet et al. | ................. | 52/514 |
| 6,193,449 B1 * | 2/2001 | Diaz | ......................... | 408/115 R |
| 6,935,079 B1 * | 8/2005 | Julian et al. | ..................... | 52/357 |
| 6,954,989 B1 * | 10/2005 | Morton | ........................... | 33/194 |

* cited by examiner

*Primary Examiner* — Eileen D Lillis
*Assistant Examiner* — Elizabeth A Plummer
(74) *Attorney, Agent, or Firm* — John R. Benefiel

(57) ABSTRACT

A formed metal piece is U-shaped to be fit to an outer edge of a framing stud, with a pair of side walls, at least one formed with a guide hole for accurately locating drilled holes for routing cables, etc. The front wall is sufficiently strong to provide nail shielding for protection of cables or pipes passed through the hole drilled in the stud. A series of pieces are installed in alignment prior to drilling the stud holes to speed the process. A cut out portion can be removed to optionally form a slot for installation as a nail shield reinforcement after the cables or piping is installed.

11 Claims, 2 Drawing Sheets

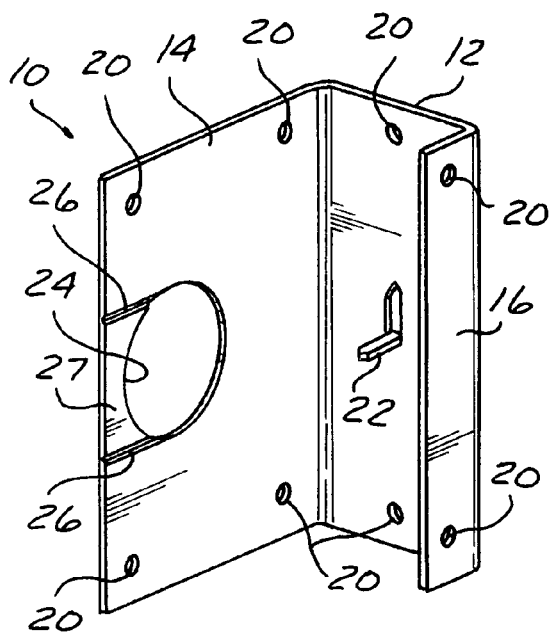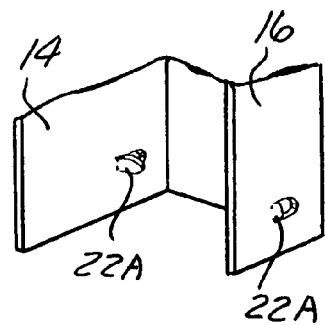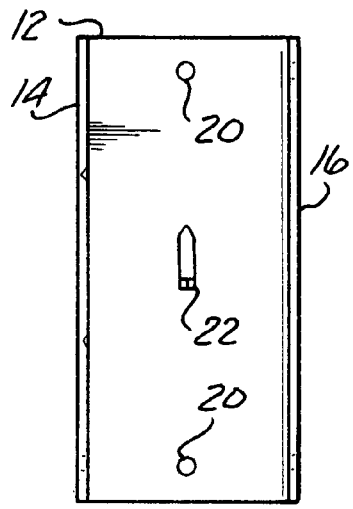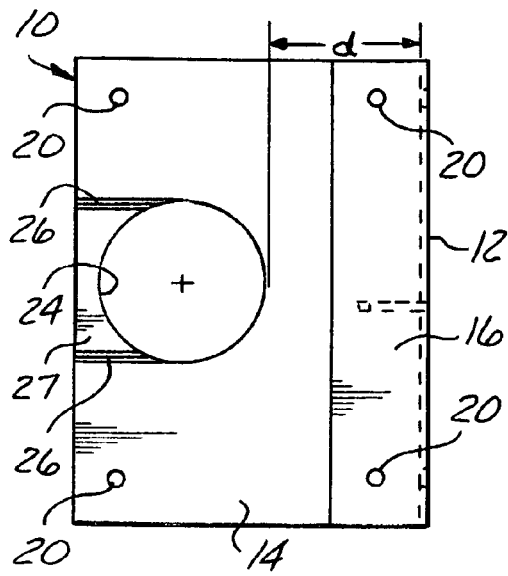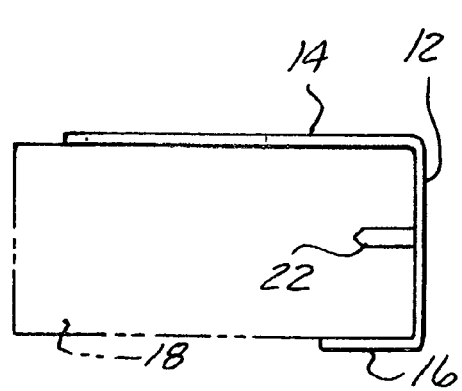
FIG. 1
FIG. 1A
FIG. 2
FIG. 3
FIG. 4

COMBINED GUIDE-NAIL SHIELD AND PROCESS

CROSS REFERENCE TO RELATED APPLICATION

This application claims the benefit of U.S. provisional application Ser. No. 60/491,468, filed Jul. 30, 2003.

BACKGROUND OF THE INVENTION

This invention concerns formed metal pieces used in wood stud framing. A great variety of such pieces are commercially available for making connections, nail shields, and reinforcements.

Holes are commonly bored through the studs for routing wiring and plumbing. Building codes often specify the location of such holes and that they be shielded with a metal plate nailed onto the outside face of the stud at the hole location.

The need to measure to properly locate each stud hole slows the construction process and is subject to error.

There have heretofore been provided metal reinforcement angles for notched out studs allowing pipes to be routed through the studs, the reinforcement angles designed to be installed after the piping has been routed.

This is done by providing an open notch in the metal angle or by providing a flange bent down to allow installation past the pipe, the flange then bent back up to close off the opening.

It is the object of the present invention to provide a formed metal piece which makes the process of drilling holes for wiring and plumbing and shielding the routed wiring or plumbing faster and more accurate.

SUMMARY OF THE INVENTION

The above recited object, and other objects which will become apparent upon a reading of the following specification and claims are achieved by a formed metal piece having a front wall sized to be fit over the outside face of a stud to cover the same, with at least one side wall perpendicular to the front wall extending across the side of the stud. The side wall has a hole formed therein properly sized and located to provide a guide for boring a hole through the stud at the proper code specified location. The piece is installed on the stud prior to drilling of the stud, and the hole is then drilled through the stud, and the wiring or piping then routed through the holes in conventional fashion. A series of pieces may first be installed on a line of studs prior to drilling the holes.

A break away section may be formed by stamping tear lines into the side wall extending to the hole to create a slot allowing alternative use of the piece as a shield reinforcement after the plumbing is installed.

A shortened side wall is preferably included to grip the stud thickness which is short enough to allow the wiring or piping to pass by the shortened wall.

DESCRIPTION OF THE DRAWINGS

FIG. 1 is a pictorial view of a guide-nail shield piece according to the invention.

FIG. 1A is a fragmentary pictorial view of the lower part of the shield piece shown in FIG. 1, showing an alternate temporary retention tongs.

FIG. 2 is a rear view of the guide-nail shield piece shown in FIG. 1.

FIG. 3 is a side view of the guide-nail shield piece shown in FIGS. 1 and 2.

FIG. 4 is a top view of the guide-nail shield piece shown in FIGS. 1-3.

DETAILED DESCRIPTION

Figure 5:
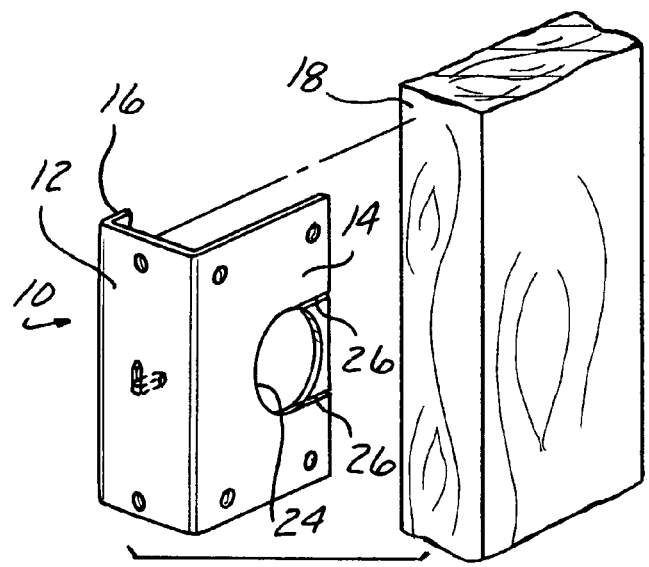
FIG. 5 is a pictorial exploded representation of a guide-nail shield piece being installed on a stud.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, guide-nail shield piece 10 according to one embodiment of the present invention is comprised of a U-shaped metal piece, typically formed from 16 gauge galvanized steel sheet as is typically required by codes in constructing nail shield pieces. The guide-nail shield piece 10 is formed into a U-shape with a front rectangular wall 12 and integrally formed side walls 14 and 16 extending rearwardly from a respective side edge of the front wall 12 to be spaced apart a distance such as to be able to be fit over a standard framing stud 18, i.e., with approximately a 1.5 inch inside width.

The piece 10 may be prepunched with nailing holes 20 on each side wall 14, 16 and the front wall 12. A formed barb 22 may also be formed in the front wall to temporarily secure the piece 10 in a desired location while nails are being driven. Alternatively, punched in tongs 22A (FIG. 1A) can be provided on side walls 14, 16.

One of the side walls, side wall 14 is deeper than the other side wall 16. The deeper side wall 14 has a hole 24 formed therein at a distance "d" from the inside of the front wall 12 corresponding to the code location for holes drilled for wiring cables (or plumbing piping) to insure a minimum remaining thickness. This remaining thickness in a direction towards the front wall would typically be on the order of 1¼" inches for a 1¼ inch diameter hole.

The wall 14 must thus be deep enough to accommodate the hole 24.

The other side wall 16 is preferably of a much shorter depth so that the hole 24 is completely clear thereof.

The side wall 16 may also be eliminated.

The piece 10 is of a height sufficient that the front wall 12 completely shields the wire or pipe passing through the hole 24, i.e., on the order of 3¼ inches.

In order to optionally allow a slot to be formed for alternative installation of the piece 10 after the wiring or plumbing is run, a pair of rearwardly extending grooves 26 are stamped in the wall 14 tangential to the hole 24, to form a knock out portion 27 lying therebetween.

The hole 24 is of a diameter to accommodate the range of wiring or plumbing sites contemplated. A hole diameter of 1¼ inches would accommodate a 1 inch copper pipe usually the largest used in residential construction that is routed within the stud walls.

According to the method of the present invention, a series of guide-nail shield pieces 10 are installed on studs 18 as indicated in FIG. 5 with the front wall 12 against the stud outer face and nailed securely thereto all aligned with each other and at the proper height on the stud 18.

Figure 6:
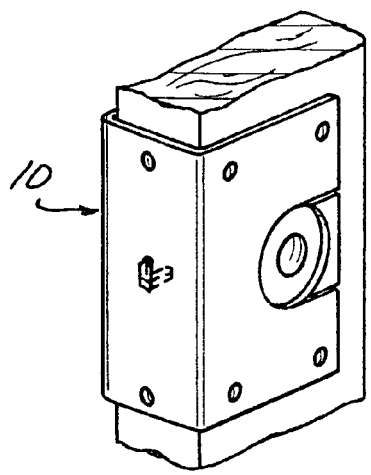
FIG. 6 shows a guide-nail shield piece installed and a stud hole being bored using a hole in the guide-nail shield piece as a guide.
Figure 7:
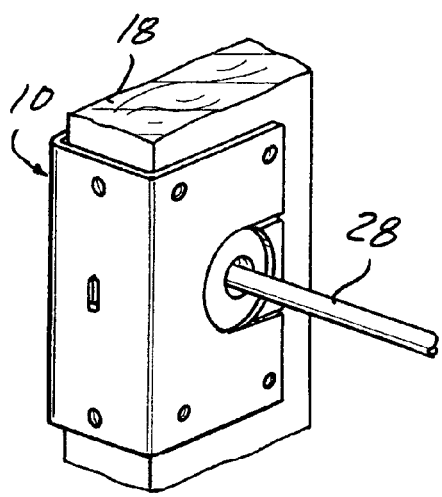
FIG. 7 shows a wire routed through the stud hole shown being bored in FIG. 6.

Using the hole 24 as a guide, a hole is drilled into each stud 18, the hole being able to be much smaller when routing wiring cable as indicated in FIG. 6.

The wiring cable or cables 28 can then be routed through the holes in the studs 18.

Larger holes for piping can also be drilled.

Figure 8:
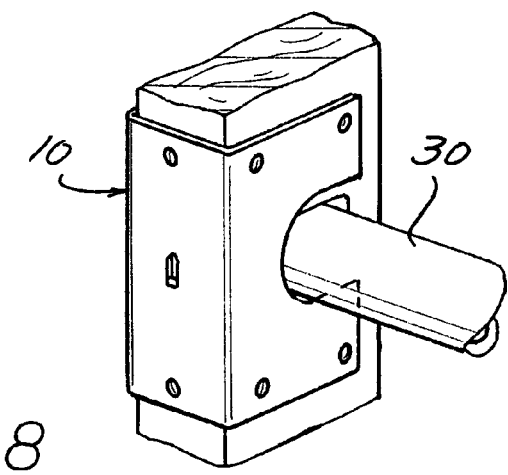
FIG. 8 shows a guide-nail shield piece installed on a stud which already has a pipe installed in a stud notching with a break out section of the guide-nail shield piece removed.

FIG. 8 shows the breakout portion 27 removed as with the use of wire cutters or snips to allow the guide-nail shield piece 10 to be installed after the pipe 30 has been routed.

This is less advantageous as the guide benefit is not realized from that use of the piece 10.

Thus, a more accurate and quicker drilling of stud holes can be achieved by use of the combination guide-nail shield piece 10 at only a slightly greater cost.

The guide-nail shield piece 10 also reinforces the stud to compensate for the weakening of the stud by drilling the holes therein.

The invention claimed is:

1. A method for drilling holes in building wall studs for receiving wiring cables or piping therein, said drilled holes at a predetermined spacing from an outer face of the studs, comprising:
   forming a sheet metal piece having a front wall and at least one side wall, said front wall being sufficiently strong to provide a nail shield;
   forming a guide hole in said side wall at said predetermined spacing from said-front wall corresponding to said hole to be drilled in said stud located so as to provide a minimum remaining thickness of said stud lying between a stud outer face and said hole of approximately 1¼ inches;
   attaching said sheet metal piece to said stud using one or more penetrating fasteners with the inside of said front wall abutting against said outer face of said stud aligned with the guide hole in said side wall at the location of a hole to be drilled through said stud; and, drilling said hole through said stud through said guide hole in said one side wall of said sheet metal piece at said predetermined spacing from said stud outer face.

2. A combination piece according to claim 1 wherein the height of said combination piece is sufficient to completely shield a wire or pipe passing through said hole.

3. A combination piece according to claim 2 wherein said piece is on the order of 3½ inches in height.

4. A combination piece according to claim 1 wherein said piece is formed of 16 gauge galvanized steel to provide nail shielding protection.

5. A combination piece according to claim 1 wherein said front wall has a prepunched barb formed therein for temporarily securing said combination piece to a stud.

6. A method for drilling holes in building wall studs for receiving wiring cables or piping therein, said drilled holes at a predetermined spacing from an outer face of the studs, comprising:
   forming a sheet metal piece having a front wall and at least one side wall, said front wall being sufficiently strong to provide a nail shield;
   forming a guide hole in said side wall at said predetermined spacing from said front wall corresponding to said hole to be drilled in said stud located so as to provide a minimum remaining thickness of said stud lying between a stud outer face and said hole of approximately 1¼ inches;
   attaching said sheet metal piece to said stud using one or more penetrating fasteners with the inside of said front wall abutting against said outer face of said stud aligned with the guide hole in said side wall at the location of a hole to be drilled in through said stud; and, drilling said hole through said stud through said guide hole in said one side wall of said sheet metal piece at said predetermined spacing from said stud outer face.

7. The method according to claim 6 wherein in said forming step, an other side wall is formed on said metal piece spaced from said one side wall to enable gripping of said stud between said one and said other side walls.

8. The method according to claim 7 wherein said other side wall is formed to be of a shorter depth than said one side wall to be clear of said hole in said one side wall.

9. A method for drilling a hole in a building wall stud for receiving wiring cables or piping therein, said drilled hole at a predetermined spacing from an outer face of said stud, comprising:
   installing a generally U-shaped sheet metal piece on said stud, with an inside of a front wall of said sheet, metal piece abutting against said outer face of said stud to locate a guide hole in a side wall of said piece at a desired location of a hole to be drilled through said stud, said front wall of said piece being solid to provide a nail shield;
   fixing said installed sheet metal piece to said stud using one or more penetrating fasteners;
   drilling said hole through said stud using said guide hole in said one side wall of said sheet metal piece to locate said drilled hole at said predetermined spacing from said stud outer face so as to provide a minimum predetermined remaining thickness of said stud lying between said stud outer face and said hole.

10. The method according to claim 9 wherein said metal piece is installed so as to grip said stud between said one side wall and another side wall spaced apart from said one side wall.

11. The method according to claim 9 wherein holes are drilled in a series of studs using a plurality of metal pieces respectively installed on said studs, a respective metal piece installed on a respective stud and aligned with each other to align said drilled holes in said studs with each other.

* * * * *

UNITED STATES PATENT AND TRADEMARK OFFICE
CERTIFICATE OF CORRECTION

| | | |
|---|---|---|
| PATENT NO. | : 8,082,701 B1 | |
| APPLICATION NO. | : 10/880338 | |
| DATED | : December 27, 2011 | |
| INVENTOR(S) | : Ronald M. Wendel | |

It is certified that error appears in the above-identified patent and that said Letters Patent is hereby corrected as shown below:

Col. 3, lines 25-45, delete Claim 1 in its entirety and insert as follows:

-- 1. A combination hole drilling guide and nail shield piece for use in drilling holes in wall studs for a building wall, said piece formed from sheet steel and having a generally rectangular front wall and a pair of side walls each extending rearwardly from a respective side of said front wall, said front wall being approximately the width of a stud to allow said front wall to abut an outer surface of a stud with said side walls overlying a respective side of said stud;

a guide hole formed in one of said side walls at a distance from said front wall to produce a predetermined minimum thickness of remaining stud material after drilling a hole through said stud aligned with said guide hole, said predetermined minimum thickness of stud material extending between said outer stud surface and said drilled hole and being approximately 1 ¼ inches, said front wall of said piece being substantially solid to be able to serve as a nail shield covering said outer surface of said stud over an area behind which lies said hole drilled through said stud;

the other of said side walls being sufficiently shorter than said one side wall to not extend into alignment with said guide hole in said one side wall; and, a pair of parallel preweakening lines tangential to said guide hole formed in said one side wall to extend rearwardly from opposite sides of said guide hole to a rear edge of said piece side wall to thereby enable ready removal of a knock out portion defined between said preweakening lines. --

Col. 4, Claim 9, line 36, delete "aside" and insert -- a side --

Signed and Sealed this
Sixth Day of March, 2012

David J. Kappos
*Director of the United States Patent and Trademark Office*